(No Model.)  3 Sheets—Sheet 1.
J. N. NALY.
BAND CUTTER AND SELF FEEDER FOR THRASHING MACHINES.
No. 321,997.  Patented July 14, 1885.
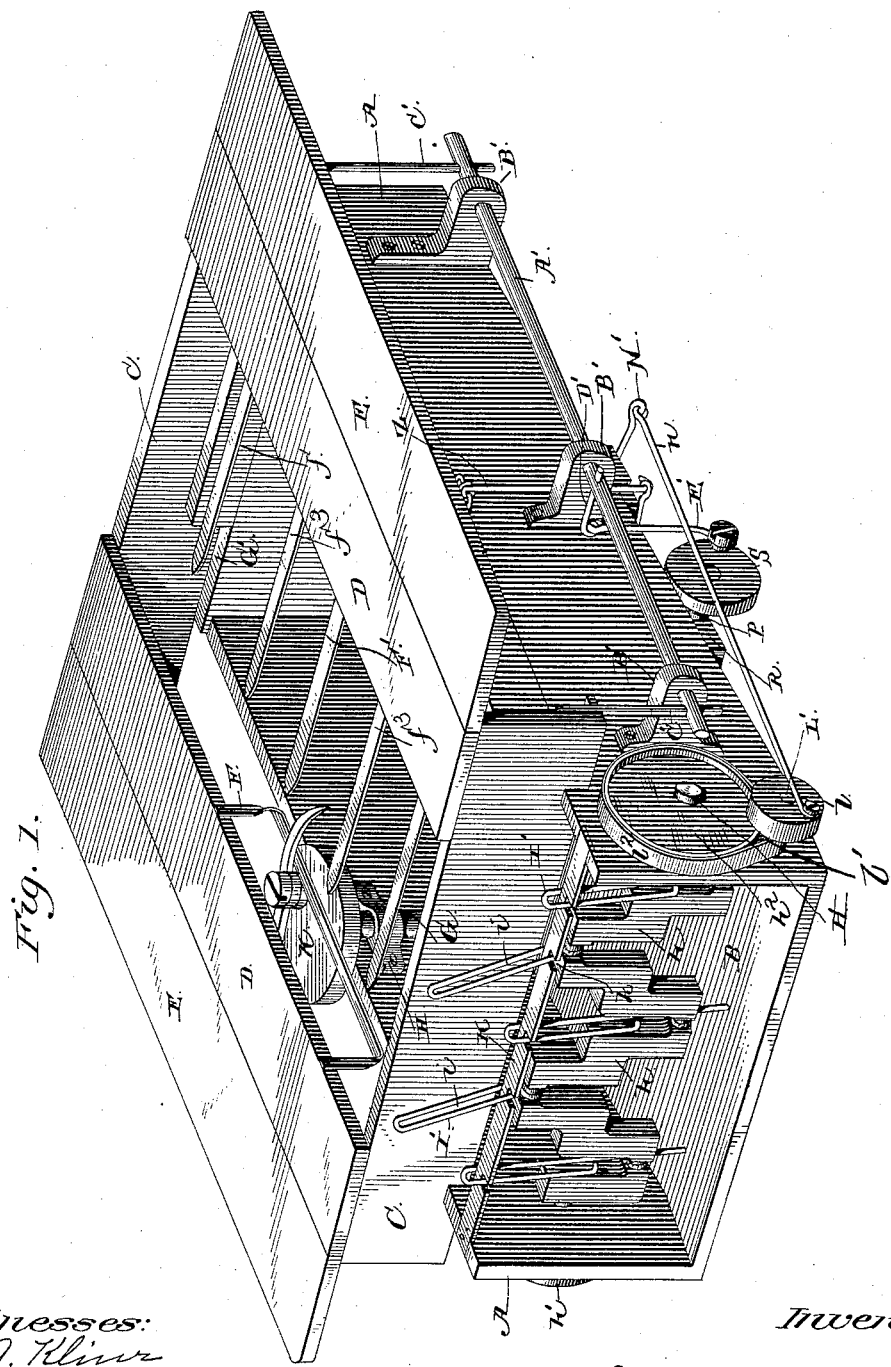
Witnesses:
S. A. Kline
Wm R. Furney
Inventor:
John N. Naly

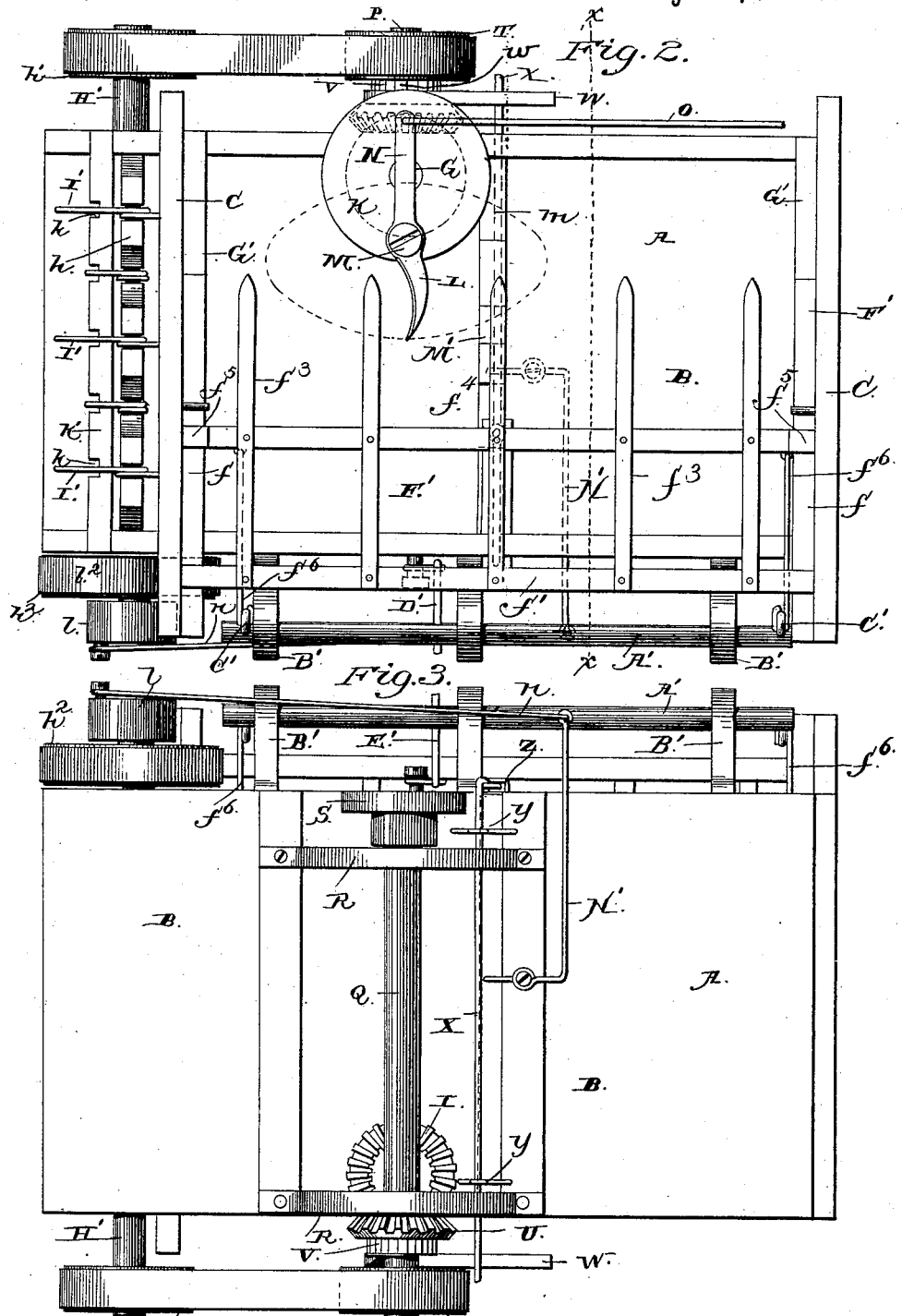

(No Model.)  3 Sheets—Sheet 3.
J. N. NALY.
BAND CUTTER AND SELF FEEDER FOR THRASHING MACHINES.
No. 321,997.  Patented July 14, 1885.
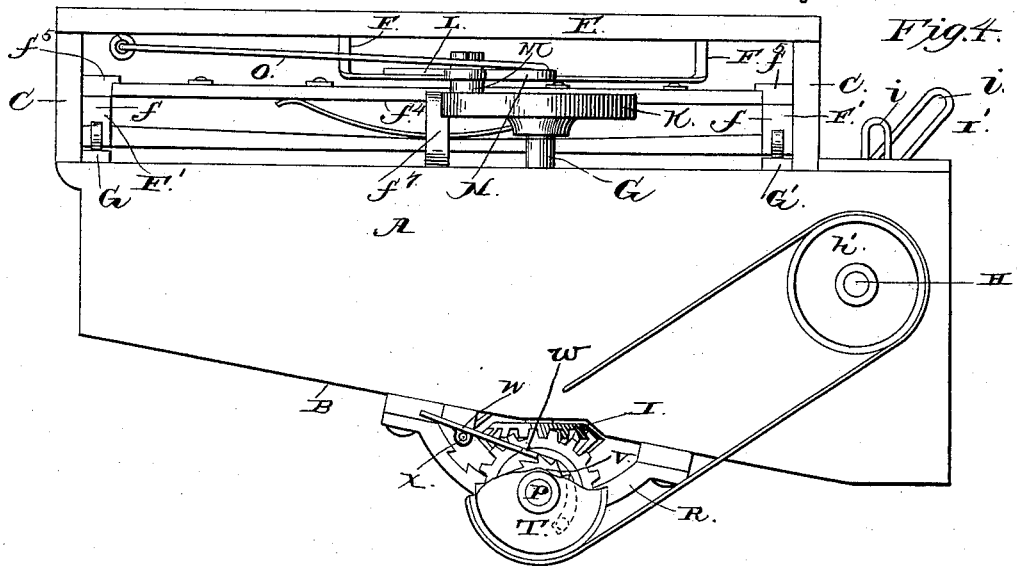
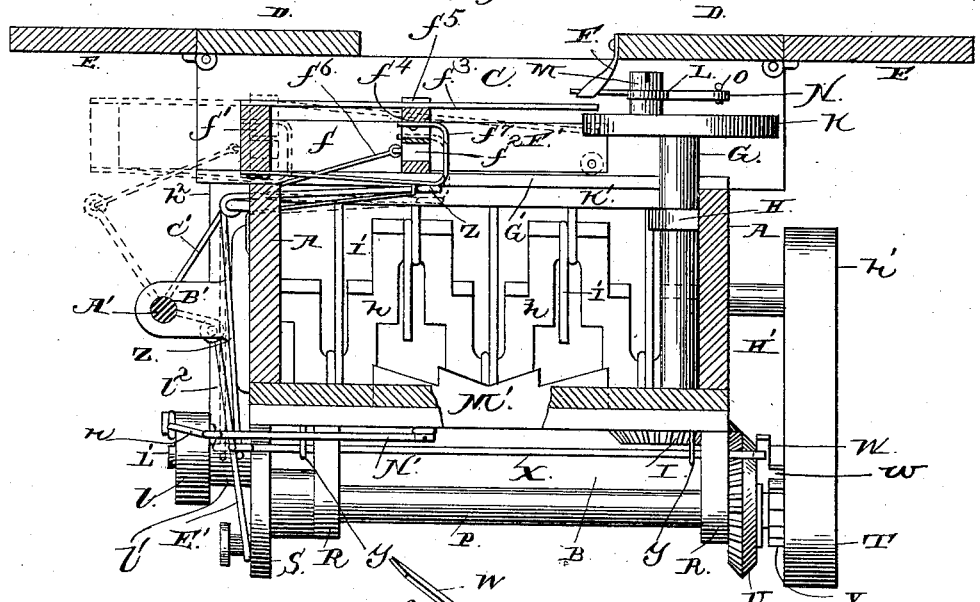
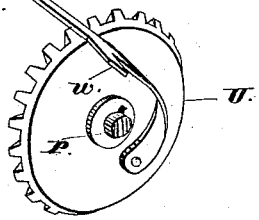
WITNESSES
M. E. Fowler
J. W. Garner
INVENTOR
John N. Naly
By C. A. Snow & Co.
His Attorneys

UNITED STATES PATENT OFFICE.

JOHN N. NALY, OF GREENSBURG, PENNSYLVANIA.

BAND-CUTTER AND SELF-FEEDER FOR THRASHING-MACHINES.

SPECIFICATION forming part of Letters Patent No. 321,997, dated July 14, 1885.

Application filed March 18, 1885. (No model.)

*To all whom it may concern:*

Be it known that I, JOHN N. NALY, a citizen of the United States, residing at Greensburg, in the county of Westmoreland and State of Pennsylvania, have invented a new and useful Band-Cutter and Self-Feeder for Thrashing-Machines, of which the following is a specification.

My invention relates to an improvement in band-cutters and feeders for thrashing-machines; and it consists in the peculiar construction and combination of devices that will be more fully set forth hereinafter, and particularly pointed out in the claims.

In the accompanying drawings, Figure 1 is a perspective view of a band cutter and feeder embodying my invention. Fig. 2 is a top plan view of the same, with the cover removed. Fig. 3 is a bottom plan view. Fig. 4 is a side elevation of the side opposite that shown in Fig. 1. Fig. 5 is a vertical transverse sectional view taken on the line $x\,x$ of Fig. 2. Fig. 6 is a detailed perspective view of the pinion U and the pawl W, pivoted thereto.

A represents an inclosing box or frame, which is adapted to be attached to one end of a thrashing-machine, and is provided with an inclined bottom, B, the vertical transverse boards C, extending across the upper edges of the sides at the ends thereof, and the top boards, D, and extending-leaves E on the upper edges of the boards C, and extending longitudinally above the frame or box. A space is left between the inner edges of the boards D sufficient for the reception of a sheaf of grain, and on the under side of one of these boards, at the inner edge thereof, is a depending guideway or guard, F.

G represents a vertical shaft that is journaled in blocks H, secured to the inner side of one of the sides of the box A. The lower end of this shaft extends through the bottom of the box, and has a miter-pinion, I, fixed rigidly to it, and to the upper end of the shaft is fixed a circular disk, K.

L represents a curved cutter, which is sharpened on its inner edge, is fulcrumed to the face of the disk K, as at M, and is provided with an outwardly-extending arm, N, that is connected by a rod, O, to one end of the box or frame.

P represents a shaft that is journaled in blocks R, secured to the bottom of the box or frame, which shaft extends transversely below the box or frame, and has fixed to one end a crank-wheel, S, and to the opposite extremity a loosely-mounted band wheel or pulley, T. A miter-pinion, U, is also fixed to the shaft P, and meshes with the pinion I. To the inner side of the pulley T is secured or formed integrally a ratchet-wheel, V.

W represents a pawl that is pivoted to the outer side of the pinion U, and has a lateral projection, $w$, on one side, adapted to engage with the ratchet-wheel V, and thereby secure the pulley F to the shaft. An endwise-moving rod, X, is secured in keepers $y$ on the bottom of the box or frame, extends transversely below the frame, and has its free end normally extended in the path of the pawl W. To the opposite extremity of the rod X is connected the lower arm of a bell-crank lever, Z, that is journaled in one side of the frame or box at the upper edge thereof, and has its horizontal arm extended into the frame for a suitable distance.

A' represents a rock-shaft that is journaled horizontally in blocks B', secured to one side of the frame A. Arms C' extend at right angles up from the ends of the rock-shaft, and from the center of the rock-shaft projects inwardly an arm, D', which is connected by a rod, E', with the crank-wheel S.

F' represents a frame, which slides and is supported upon ways G', that are formed on the lower ends of the vertical end boards, C, at the inner sides thereof. This frame consists of the end bars, $f$, the connecting longitudinal bar $f'$ at the outer ends thereof, and the connecting-bar, $f^2$, located at about the center of the bars $f$ and at the lower side thereof. Spring-tines $f^3$ are secured at their outer ends on the upper side of the bar $f'$, and extend inwardly across the frame A for a suitable distance, and form a table, onto which are thrown the sheaves of grain. A connecting-bar, $f^4$, is bolted to the under sides of the spring-tines, and extends the length of the frame. The upward movement of the bar $f^4$ and the spring-tines is limited by blocks or brackets $f^5$ that are secured on the upper sides of the end bars, $f$, and extend inwardly over the ends of the bar $f^4$. This frame is connected to the upper ends of the arms C' of the rock-shaft by rods $f^6$. To the under side of the bar $f^1$ is secured one end of a flat spring, $f^7$, which is bent outwardly around and under the bar $f^2$, and extends back about horizontally therefrom, and has its outer end secured to the under side of the bar $f'$. This spring normally rests lightly upon the horizontal arm of the bell-crank lever Z.

H' represents a shaft that is journaled in the open end of the frame A. This shaft has a series of double cranks, $h$, extending entirely across the mouth of the box or frame, and is provided at one end with a fixed pulley, $h'$, similar to the pulley T, and at the opposite end with a larger fixed pulley, $h^2$.

I' represents feeding-teeth that are journaled to the wrists of the cranks, and have loops or slots $i$ at their upper ends. A transverse bar, K', is secured in the upper edges of the sides of the box or frame, above and slightly in front of the shaft H', and is provided with a series of notches, $k$, engaging the teeth I', as shown. On a spindle, L', projecting from the side of the box or frame, below the shaft H', is journaled a crank-wheel, $l$, with which is formed integrally on its inner side a small pulley, $l'$. An endless belt, $l^2$, connects the pulleys $h^2$ and $l'$.

M' represents a shaker or straw-spreader that works in a slot, $m$, extending transversely across the bottom of the box or frame, at the center thereof. The upper face of this straw-spreader projects above the bottom of the box or frame, and is serrated or notched, as shown. A horizontal bell-crank lever, N', is fulcrumed to the bottom of the box or frame, and has its short arm connected to the straw-spreader, its outer arm extending beyond one side of the box or frame, and is connected to the crank-wheel $l$ by a rod, $n$. The crank-wheel $l$ is made broad, so as to serve as a driving-pulley for communicating motion from the thrashing-machine to the attachment, herein described, for cutting the bands and feeding the straw to the thrasher.

The operation of my invention is as follows: While the thrashing-machine to which the attachment is secured is in operation, the feeding-teeth, straw-spreader, and pulley T are in constant motion, as will be very readily understood, but the reciprocating or sliding frame F', and the shafts G, P, and A', and their connecting-gears will be normally idle, the frame F' being in its initial position, (shown in solid lines in Fig. 5,) its spring-tines being at a horizontal position and extending across the space left between the top boards, D. When a sheaf of grain is placed on the sliding frame, the weight of the sheaf causes the spring-tines to become depressed. The spring $f^7$ bears heavily upon the horizontal arm of the bell-crank lever Z, causing said lever to draw the endwise-moving rod out of the path of the pawl W, which thereupon falls by its own gravity into engagement with the ratchet-wheel V. The motion of the pulley T then causes the shafts G and P to rotate, and thereby imparts motion to the cutter L and the sliding frame. The cutter moves through the path described by the dotted ellipse in Fig. 2, and cuts the binding straws or cord of the sheaf, and as the sliding frame begins to recede, owing to the inclination of the tines, the straw drops to the bottom of the box or frame onto the straw-spreader, which distributes the straw evenly over the bottom, when it is caught as it slides down the inclined bottom by the feeding-teeth I, the motion of which will be readily understood, and fed to the thrashing-machine, which is not here shown nor particularly described, as it forms no part of my invention. When the straw is delivered from the sliding frame F', the tines reassume their horizontal initial position, and the endwise-moving rod is thrust out and arrests the pawl as it comes around, and disconnects the actuating mechanism of the frame F' and the cutter, as before, until another sheaf is placed on the tines, when the operation is repeated as before.

Having thus described my invention, I claim—

1. The combination of the frame, the cutter, and the reciprocating frame having the yielding tines for receiving the sheaves and presenting them to the cutter, gearing for actuating the frame and the cutter, and mechanism for throwing the gearing into operation when the tines yield and for disconnecting the same when the tines resume their normal position, substantially as described.

2. The combination of the frame, the reciprocating frame having the yielding tines, the rotating crank-disk, the cutter fulcrumed thereto and having the extended arm, and the rod connecting said arm to a fixed point, whereby the point of the cutter will be caused to describe an ellipse, substantially as described.

3. The combination of the frame, the vertical shaft journaled therein and having the cutter at its upper end and the miter-pinion at its lower end, the horizontal shaft journaled below the frame, the loose pulley and ratchet-wheel and the fixed pinion U on said shaft, and the crank-wheel, the pawl pivoted to the pinion U, the rod X, for disengaging the pawl, the reciprocating frame having the yielding tines, the rock-shaft having the arms connected with the crank-wheel of the horizontal shaft and with the reciprocating frame for moving the latter, and the bell-crank lever for moving the rod X out of the path of the pawl and permitting it to engage the ratchet-wheel when the tines yield, substantially as described.

4. The combination of the frame, the cutter, the reciprocating frame having the yielding tines, the devices for feeding the straw from the frame, mechanism for actuating the reciprocating frame, cutter, and feeder, and means whereby the mechanism for actuating the cutter and reciprocating frame is thrown into gear with the mechanism for actuating the feeder when the tines of the reciprocating frame yield, substantially as described.

5. The combination of the frame, the cutter, the vertical shaft for actuating the cutter, having the miter-pinion at its lower end, the horizontal shaft having the loose pulley and ratchet-wheel, the miter-pinion U, meshing with the miter-pinion of the vertical shaft, and the crank-wheel, the pawl pivoted to the pinion U, the rod X, for disengaging the pawl, the reciprocating frame having the yielding tines, the rock-shaft having the arms connected with the crank-wheel of the horizontal shaft and with the reciprocating frame, the bell-crank lever for moving the rod X out of the path of the pawl when the tines yield, and the feeder comprising the crank-shaft, the feeding-teeth fulcrumed to the wrists of the cranks and having the slots, the fixed rod extending through the slots, and the pulley connected with the loose pulley of the horizontal shaft, substantially as described.

6. The combination of the frame, the cutter, and the reciprocating frame for holding the sheaves to the cutter, with the crank-shaft journaled in the discharge end of the frame, the feeding-teeth fulcrumed to the wrists of the cranks and having the slots, and the fixed rod passed through the slots of the teeth, substantially as described.

7. The combination of the frame, the vertical shaft, the cutter at its upper end, the miter-pinion at its lower end, the horizontal shaft, the loose pulley and ratchet-wheel thereon, the miter-pinion U, fixed on the horizontal shaft and meshing with the pinion of the vertical shaft, and the crank-wheel S, the pawl pivoted to the pinion U, the rod X, bearing under the pawl, the reciprocating frame having the yielding tines, the rock-shaft having the arms connected with the crank-wheel S and with the reciprocating frame, the bell-crank lever for moving the rod X out of the path of the pawl when the tines yield, the crank-shaft journaled in the discharge end of the frame, the feeding-teeth fulcrumed to the wrists of the cranks and operated thereby, the reciprocating straw-spreader in the bottom of the frame, the bell-crank lever M', for operating the straw-spreader, the driving crank-pulley, the rod connecting the crank-pulley with the free end of the bell-crank lever M', and gearing for connecting and operating the parts, substantially as described.

JOHN N. NALY.

Witnesses:
S. A. KLINE,
WM. R. TURNEY.